US008625159B2

(12) United States Patent
Boness et al.

(10) Patent No.: US 8,625,159 B2
(45) Date of Patent: Jan. 7, 2014

(54) METHOD FOR DETECTING ERRORS IN INDIVIDUAL COLOR SEPARATION IMAGES OF A MULTI-COLOR PRINTING MACHINE

(75) Inventors: Jan D. Boness, Bad Bramstedt (DE); Ingo K. Dreher, Kiel (DE); Heiko Hunold, Wattenbeck (DE); Ralf Jachmann, Wees (DE); Ralph Petersen, Luetjenburg (DE); Frank Pierel, Gettorf (DE); Stefan Schrader, Kiel (DE); Matthias Wecker, Bebra-Asmushausen (DE); Tim D'Avis, Raisdorf (DE)

(73) Assignee: Eastman Kodak Company, Rochester, NY (US)

( * ) Notice: Subject to any disclaimer, the term of this patent is extended or adjusted under 35 U.S.C. 154(b) by 573 days.

(21) Appl. No.: 12/934,736

(22) PCT Filed: Jan. 22, 2009

(86) PCT No.: PCT/EP2009/050678

§ 371 (c)(1),
(2), (4) Date: Dec. 1, 2010

(87) PCT Pub. No.: WO2009/121637

PCT Pub. Date: Oct. 8, 2009

(65) Prior Publication Data

US 2011/0063643 A1 Mar. 17, 2011

(30) Foreign Application Priority Data

Mar. 31, 2008 (DE) ......................... 10 2008 016 456

(51) Int. Cl.
*G06K 15/22* (2006.01)
*H04N 1/00* (2006.01)
*H04N 1/60* (2006.01)
*H04N 1/21* (2006.01)
*G03G 15/00* (2006.01)
*G03G 15/01* (2006.01)

(52) U.S. Cl.
USPC .............. 358/1.9; 358/1.4; 358/1.6; 358/296; 399/38; 399/40; 399/160; 399/301

(58) Field of Classification Search
USPC ........... 358/1.9, 1.4, 1.6, 1.2, 1.15, 1.18, 501, 358/526, 537, 540, 401, 452, 453, 466, 496, 358/296, 300, 302; 399/301, 49, 160, 6, 9, 399/14, 17, 22, 23, 28, 31, 38, 40, 72, 84, 399/127, 131, 130, 194, 298; 347/104, 105, 347/116, 232, 115, 110, 5, 24, 32; 271/111, 271/226, 227, 3.13, 3.14, 3.15, 3.17, 8.1, 271/9.09, 17, 10.12, 236, 239, 244, 259, 271/265.02, 278
See application file for complete search history.

(56) References Cited

U.S. PATENT DOCUMENTS

| | | | | |
|---|---|---|---|---|
| 5,823,692 | A * | 10/1998 | Tolrud et al. | 400/582 |
| 6,275,244 | B1 * | 8/2001 | Omelchenko et al. | 346/116 |
| 2002/0051648 | A1 * | 5/2002 | Shimomura et al. | 399/49 |
| 2002/0136570 | A1 * | 9/2002 | Yamanaka et al. | 399/301 |
| 2003/0029341 | A1 * | 2/2003 | Metzler | 101/485 |
| 2003/0202810 | A1 | 10/2003 | Udaka et al. | |
| 2007/0144375 | A1 * | 6/2007 | Jeschonneck et al. | 101/248 |
| 2008/0225307 | A1 * | 9/2008 | Murayama et al. | 358/1.4 |

FOREIGN PATENT DOCUMENTS

| | | |
|---|---|---|
| DE | 10320064 | 9/2004 |
| EP | 0909646 | 4/1999 |
| EP | 1679554 | 1/2006 |
| WO | 2009/027199 | 3/2009 |

* cited by examiner

*Primary Examiner* — Ngon Nguyen
(74) *Attorney, Agent, or Firm* — Amit Singhal

(57) ABSTRACT

A method for detecting errors in individual color separation images of a multi-color printing machine, in particular an electrophotographic printing machine, comprising a plurality of printing units, is described. Using this method, first a plurality of first register lines is printed with a first printing unit, and a plurality of second register lines is printed with a second printing unit in such a manner that each of the first register lines, together with one of said second register lines, is positioned inside a respective registration frame. Then the plurality of the first and second register lines in the respective registration frame are detected with a register sensor, and an output signal of the register sensor relating to the respective second register line is compared with an intensity threshold value in order to determine whether the second register lines can be recognized. In an alternative embodiment of the method, a plurality of the first register lines is printed with a first printing unit in such a manner that each of the first register lines is printed within a respective registration frame. Subsequently, the plurality of the first register lines in the respective registration frames is detected with a register sensor, and an output signal of the register sensor relating to the respective first register lines is compared with a pre-specified intensity threshold value in order to determine whether the first register lines are recognizable.

12 Claims, 4 Drawing Sheets

METHOD FOR DETECTING ERRORS IN INDIVIDUAL COLOR SEPARATION IMAGES OF A MULTI-COLOR PRINTING MACHINE

FIELD OF THE INVENTION

The present invention relates to a method for detecting errors in individual color separation images of a multi-color printing machine, in particular an electrophotographic printing machine comprising a plurality of printing units.

BACKGROUND OF THE INVENTION

In printing technology it is known to print register marks for various purposes, for example for calibration purposes or for the adjustment of the circumferential register for a print job. As a rule, such register marks consist of a plurality of register lines, with each printing unit of the printing machine printing at least one register line within the register mark. As a rule, the register marks are directly printed on a circulating transport belt of the printing machine.

Subsequently, the register marks thus printed are moved past a register sensor that measures the register mark. This register sensor, as a rule, is only able to detect the start and the end of a respective register line based on light/dark or dark/light transitions. FIG. 2 shows an example of a register mark and an example of a signal curve of a register sensor in the case of an error-free detection of the register mark. An error-free detection is given whenever the signal curve of the register sensor indicates that a number of signals corresponding to the number of expected register lines exists above the detection threshold value. As a rule, at least twice as many signals than expected register lines will be present above the threshold value, because each time a signal is present at the start of the register line (transition from light to dark) as well as at the end of a register line (transition from dark to light).

If now, for example, a malfunction occurs in one of the printing units, said malfunction having the effect that one of the register marks is not being sharply or not with full intensity transferred to the transport belt, it is possible for the signal level of the register sensor to be located below the detection threshold value. The resultant signal curve would then not be consistent with the expected curve (there is not a sufficient number of signals above the threshold value), so that the register mark as a whole is discarded as being faulty. If only individual register marks are discarded, this does not represent a problem, as a rule. However, if this status persists for a certain period of time (e.g., for a few minutes), processes related to the printing of the register marks such as, for example, a calibration or the adjustment of the circumferential register of entire printing jobs can no longer be successfully performed, because no data are available therefore.

This status can be automatically recognized in a relatively simple manner, however, the localisation where the malfunction occurred is very complex and time-consuming. At this time, no information is being obtained as to the printing unit where the malfunction might have occurred because the entire information regarding the register mark is being discarded. Until now, only a manual process has been provided for localizing the malfunction. In this process, a service technician causes the register marks to be printed on the transport belt of the printing machine and interrupts this printing before the respective register marks are removed again by a cleaning device for the transport belt. Then, the service technician uses an adhesive tape to lift one or more register marks off the transport belt and attempts to visually determine which one of the color separation images could display the problem. As is readily obvious, this method is very time-consuming and fraught with errors.

Therefore, it is the object of the invention to automatically detect errors in individual color separation images of a multi-color printing machine in a simple manner.

SUMMARY OF THE INVENTION

In accordance with the invention, this object is achieved with a method for detecting errors in individual color separation images of a multi-color printing machine, in particular, an electrophotographic printing machine comprising a plurality of printing units, in that first a plurality of first register lines is printed with a first printing unit, and a plurality of second register lines is printed with a second printing unit in such a manner that each of the first register lines, together with one of the respective second register lines, is printed inside a respective register frame. Subsequently, the plurality of the first and of the second register lines in the respective register frame is detected with a register sensor, and an output signal of the register sensor relating to the respective second register line is compared with an intensity threshold value in order to determine whether the second register lines can be recognized. In this way, it is possible to check an individual color separation image that has been produced by the second printing unit. In this process, the first register line serves to initialize the register sensor and can additionally be used as an intensity reference and as a position reference.

Furthermore, in a preferred embodiment, a plurality of first register lines is printed with the first printing unit and a plurality of additional register lines is printed with an additional printing unit in such a manner that each of the first register lines, together with one of the respective additional register lines, is printed within a respective register frame, whereby, subsequently, the plurality of the first and the additional register lines inside the respective register frames is detected with a register sensor, and an output signal of the register sensor relating to the respective additional register line is compared with an intensity threshold value in order to determine if the additional register lines can be recognized. As a result of this, it becomes possible to check individual color separation images for each one of the printing units for their detectability.

In one embodiment of the invention, the first printing unit is used for printing two of the first register lines per register frame. Preferably, the intensity threshold value for the second or the additional register lines is derived from the intensity of one of the first register lines in order to automatically compensate for a contaminated background, for example.

In one embodiment of the invention, the output signal of the register sensor relating to the respective second or additional register line is compared with at least one additional intensity threshold value, said value being higher than the first intensity threshold value, in order to determine whether the second or additional register lines can also be recognized with the higher intensity threshold value. As a result of this, it is possible to obtain a gradation regarding the quality of the individual color separation images.

If, for example, the design of the register sensor or of an analyzer does not permit a comparison of the output signal of the register sensor with different intensity threshold values, printing of the first and the second or of the first and the additional register lines and the detection thereof may be repeated—whereby the output signal of the register sensor relating to the respective second or the additional register line can then be compared with at least one additional intensity threshold value that is higher than the first intensity threshold value—in order to determine whether the second or additional register lines can also be detected with the higher intensity threshold value. This, too, makes possible a gradation regarding the quality of the individual color separation images.

In one embodiment, the first intensity threshold value is smaller than 50% of the expected output signal, and the additional intensity threshold value is between 50% and 70% of the expected output signal.

Preferably, the output signal of the register sensor is used to additionally determine the position of the second or the additional register lines relative to the first register lines inside the respective register frame. Consequently, it is also possible to check whether the register lines of the individual printing units are properly positioned, because it is not only a missing sharpness or intensity of the register lines that can result in an improper detection. For example, it is also possible that the register lines that usually are to be at a distance from each other will overlap, so that also in this case a proper detection of the register lines by the register sensor is not possible. Such faulty positioning could be recognized by means of a determination of the position. In particular, it is possible, in so doing, to determine an overlapping (or even interchanging) of register lines within the complete register marks, i.e., when all the register lines are printed.

In one embodiment of the invention, the first printing unit is used to print black register lines which, as a rule, provide the highest signal level for initializing the register sensor. When different colors are used, the intensity threshold values may be selected differently for the comparison, this being useful, for example when Clear DryInk (CDI) is being used, said ink being essentially transparent. As a rule, such inks are printed on a wide black register line in order to provide an adequate signal level. If it were to be printed directly on the transport belt, the register sensor would not provide an adequate signal level.

Preferably, each of the register lines is printed on a circulating transport belt of the printing machine in order to avoid having to provide an additional printing medium such as, for example, printing sheets that would have to be discarded later. In this embodiment, the transport belt is subsequently cleaned downstream of the register sensor.

Also, the object underlying the invention is achieved by a method for checking the functionality of a multi-color printing machine, in particular of an electrophotographic printing machine comprising a plurality of printing units, wherein first a plurality of register marks consisting of register lines of individual printing units is printed inside respective register frames, and the register marks are detected by a register sensor, wherein, using the output signal of the register sensor, it is determined whether a number of register lines corresponding to the number of printing units can be recognized, the entire register mark being discarded if this is not the case, and wherein the above-described method is carried out if a prespecified number or a prespecified percentage of register marks has been discarded. Consequently, this method permits an automatic error analysis if errors have occurred during the printing of the register marks for different purposes such as, for example, calibration purposes or the adjustment of the circumferential register for individual print jobs.

The object underlying the invention is also achieved by a method for the detection of errors in individual color separation images of a multi-color printing machine, in particular an electrophotographic printing machine comprising a plurality of printing units, wherein first a plurality of first register lines is printed with a first printing unit in such a manner that each of the first register lines is printed within a respectively separate register frame. Subsequently, the plurality of first register lines inside the respective register frames is detected by a register sensor, and the output signal of the register sensor relating to the respective first register lines is compared with a prespecified intensity threshold value in order to determine whether the first register lines can be recognized. This method is suitable, in particular, for checking the first register line that is used in a method of the aforementioned type, i.e., in a method in which the first register lines are used for initializing the register sensor. Although the method is specifically suitable for checking the detectability of the first register line (i.e., black), it is also possible to use said method, individually, for each different color, with one prespecified intensity threshold value that has not been derived from an initialization register line being used for each color.

Preferably, in accordance with the above-described method, at least one additional register line is printed in each of the register frames, said additional register line being detected by the register sensor, with the output signal of the register sensor relating to the respective additional register lines being compared with a prespecified intensity threshold value that is derived from the intensity of the output signal relating to the first register line in order to determine if the additional register lines can be recognized.

The above-described methods may be combined with each other in a suitable manner.

Hereinafter the invention will be explained in detail with reference to a preferred embodiment of the invention and with reference to the drawings.

DETAILED DESCRIPTION OF THE INVENTION

Figure 1:
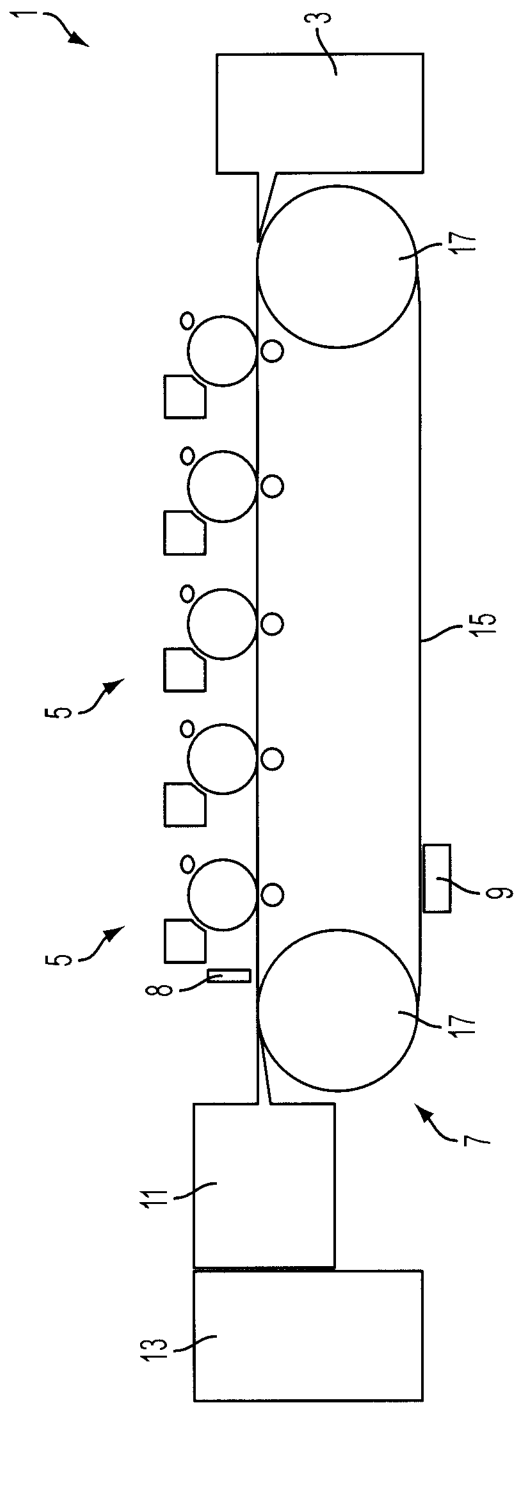
FIG. 1 a schematic representation of a multi-color printing machine.

FIG. 1 is a schematic representation of a multi-color printing machine 1 comprising a feeder 3, a plurality of printing units 5, a transport unit 7, a register sensor 8, a cleaning unit 9, a fusing unit 11, and a sheet deliverer 13. The most diverse embodiments of such multi-color printing machines are known, and FIG. 1 is a representation of only a highly simplified example thereof.

The feeder 3 serves to receive a stack of sheets and to feed separated sheets to the transport unit 7 and is arranged at a first end of said transport unit.

The printing units 5 are of a suitable type in order to print the respective color separation images on sheets that have been separated by the feeder and fed to the transport unit. The depicted multi-color printing machine 1 comprises five printing units 5 that, for example, may be operated with the colors Black, Cyan, Magenta, Yellow and a custom color such as, for example Clear DryInk. The printing units 5 are shown as electrophotographic printing units; however, they may also be printing units based on ink jet technology or another printing technology. The printing units 5 are arranged above the transport unit 7.

The transport unit 7 essentially comprises a transparent transport belt 15 that is guided in a manner so as to circulate around appropriate guide rollers and/or drive rollers 17 in order to provide a closed-loop path of movement.

Figure 2:
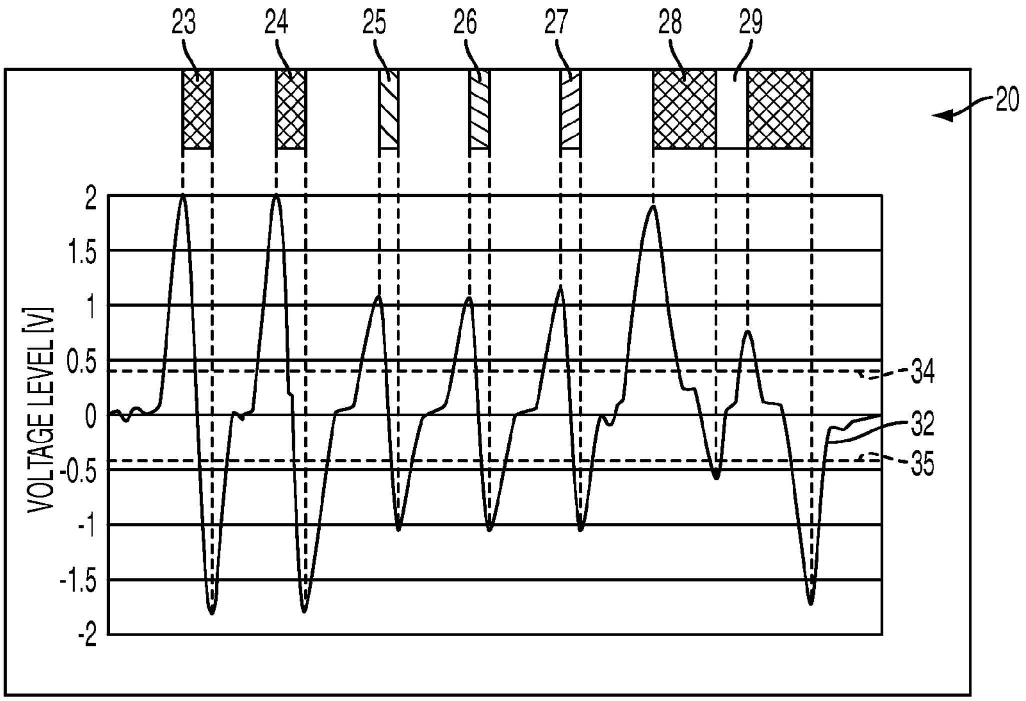
FIG. 2 a schematic representation of an example of a register mark and a typical signal curve with an error-free detection of a register mark.

Viewed in circulating direction of the transport belt 15, the register sensor 8 is an optical sensor that is directed at the transport belt 15 downstream of the printing units. Below the transport belt 15, a reflector or white background (not illustrated) is provided opposite the register sensor 8. The most diverse optical sensors may be used as the register sensor 8. Hereinafter, it is assumed that a sensor is used that generates a voltage signal consistent with light/dark and dark/light transitions, respectively, as shown in FIG. 2, for example. Inside the sensor or in an external analyzer circuit, the generated voltage signal can be compared with a prespecified threshold value and can be evaluated.

Viewed in circulating direction of the transport belt, the cleaning unit 9 is arranged downstream of the register sensor and comprises suitable means for cleaning the transport belt such as, for example, rotating brushes or stationary strippers.

Viewed in circulating direction of the transport belt 15, the fusing unit 11 is arranged downstream of the printing units 5 at the end of the transport unit 7 remote from the feeder 3 and is suitable for receiving printed sheets from the transport belt 15. Suitable means for fusing a toner that has been applied, for example, by the electrophotographic printing units are provided in the fusing unit 11. The feeder 13 is provided adjacent to the fusing unit 11 and serves to receive printed sheets.

During the operation of the multi-color printing machine 1, it is possible to print register marks on the transport belt for different purposes such as, for example, for calibration purposes or for the adjustment of the circumferential register for a print job. These register marks are then moved past the register sensor 8 and are detected.

FIG. 2 shows a schematic view of a signal curve of a register sensor during the detection of an exemplary register mark 20 consisting of a plurality of register lines 23 through 29. In the shown example, the register mark 20 consists of two register lines 23, 24 of the color Black, one register line 25 of the color Cyan, one register line 26 of the color Magenta, one register line 27 of the color Yellow, one wider register line 28 of the color Black, as well as a register line 29 of Clear DryInk printed on the wider register line 28, said Clear DryInk producing an essentially transparent line after having been fused. Prior to fusing, the line is slightly milky.

The output signal of the register sensor is represented as the curve 32 that generates voltage peaks at respective light/dark and dark/light transitions. Positive voltage levels are generated at light/dark transitions, whereas negative voltage levels are generated at dark/light transitions. The respective detection threshold values are shown at 34 and 35, respectively, said values being compared with the voltage levels in order to provide a correct detection of light/dark and dark/light transitions and thus of individual register lines.

As is obvious from FIG. 2, the respective black register lines 23, 24 and 28 generate at their respective leading edges, i.e., at a light/dark transition, a positive voltage level of approximately 2 Volts. A voltage signal of approximately −1.9 Volts is generated at the dark/light transitions at their respective trailing edges. The register lines 25, 26 and 27 generate a voltage level of 1 to 1.2 Volts at their leading edges, and voltage values of approximately −1 to −1.2 Volts at their trailing edges. The register line 29 printed on the wider register line 28 generates a voltage level of approximately −0.6 Volts at its leading edge at the dark/light transition, and a voltage level of approximately 0.8 Volts at its trailing edge. Of course, the stated values should be viewed only as examples.

The output signal, however, clearly shows seven voltage peaks that are above the upper detection threshold value 34, and seven voltage peaks that are below the detection threshold value 35, i.e., corresponding to the number of register lines to be detected.

Consequently, as mentioned above, the output signal of the register sensor represents the output signal of an error-free detection of a register mark 20.

Figure 3:
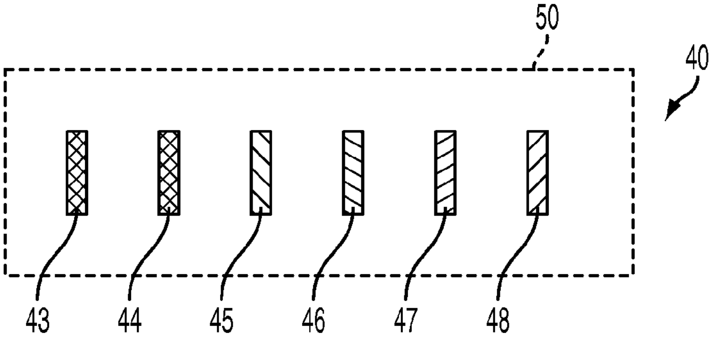
FIG. 3 a schematic representation of an alternative register mark.

FIG. 3 shows an example of an alternative register mark 40 consisting of the register lines 43 through 48. Each of the respective register lines 43 through 48 is printed within a virtual register frame 50 that prespecifies a correct positioning of the register mark. The virtual register frame may define the limits within which the register sensor performs a detection of the register lines. Each of the individual register lines has a color that is distinctly set off against the background (e.g., the transport belt or a reflector located below) in order to permit a stand-alone detection by one register sensor above a threshold value. Consequently, it is not necessary to print out one of the register lines on top of another in order to provide sufficient contrast for detection.

Figure 4:
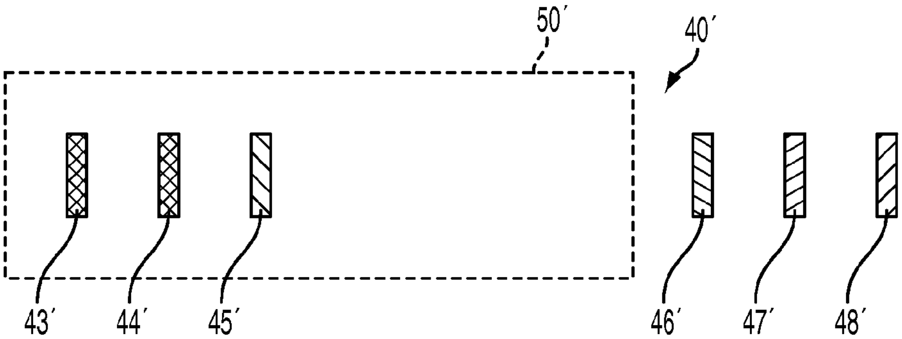
FIG. 4 a schematic representation of a reduced register mark.

FIG. 4 shows a special form of a reduced register mark 40' where the register lines 43', 44' and 45' are printed within a virtual register frame 50', whereas the register lines 46', 47' and 48' are printed outside the register frame 50'. In such a reduced register mark 40', it is also possible to completely omit any register lines located outside the register frame 50', for example, the register lines 46' through 48'.

Figure 5:
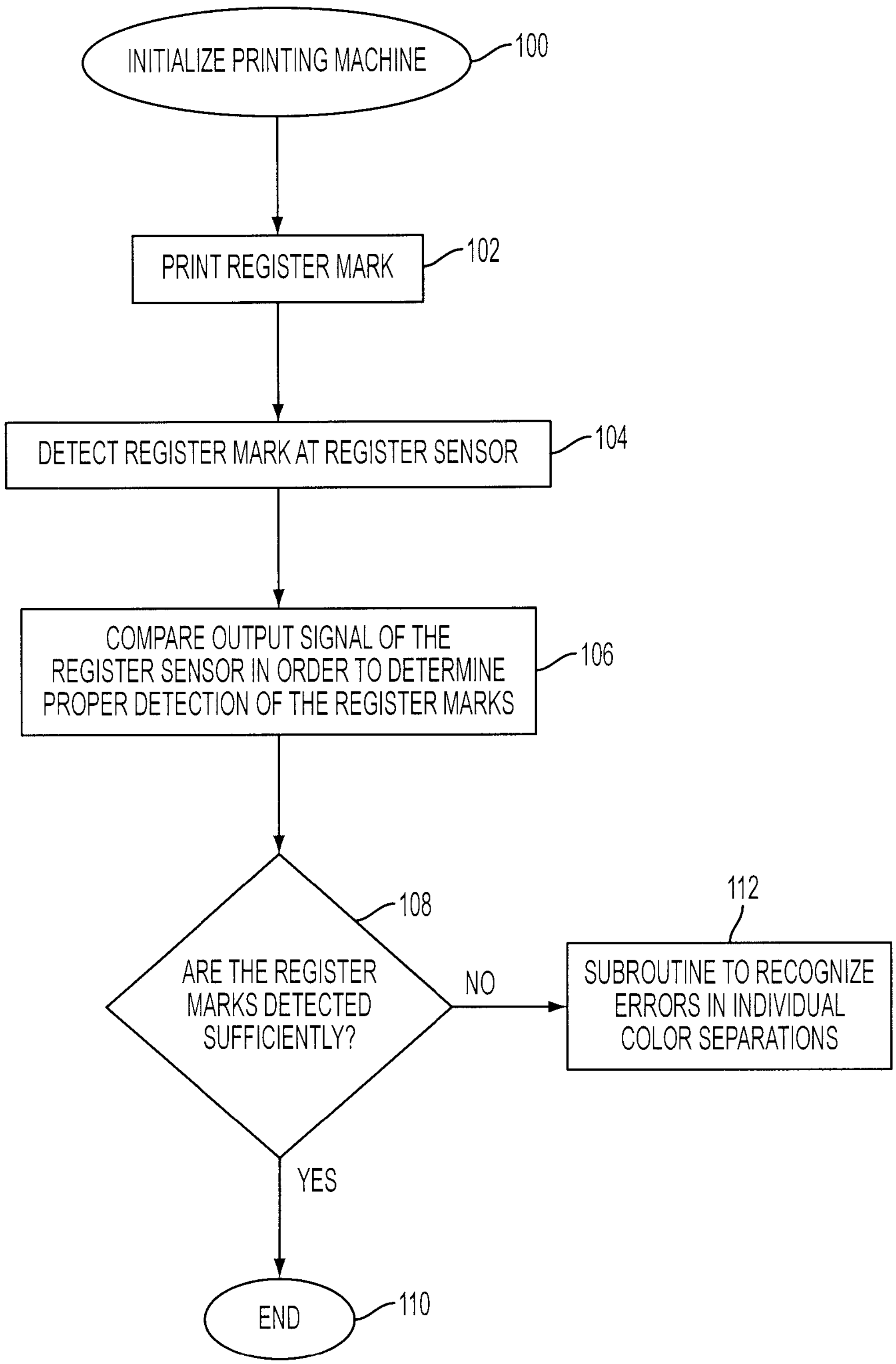
FIG. 5 a flow diagram showing an example of the process of checking the functionality of a printing machine; and, FIG. 6 a flow diagram showing an example of the process of detecting errors in individual color separation images of a printing machine.
Figure 6:
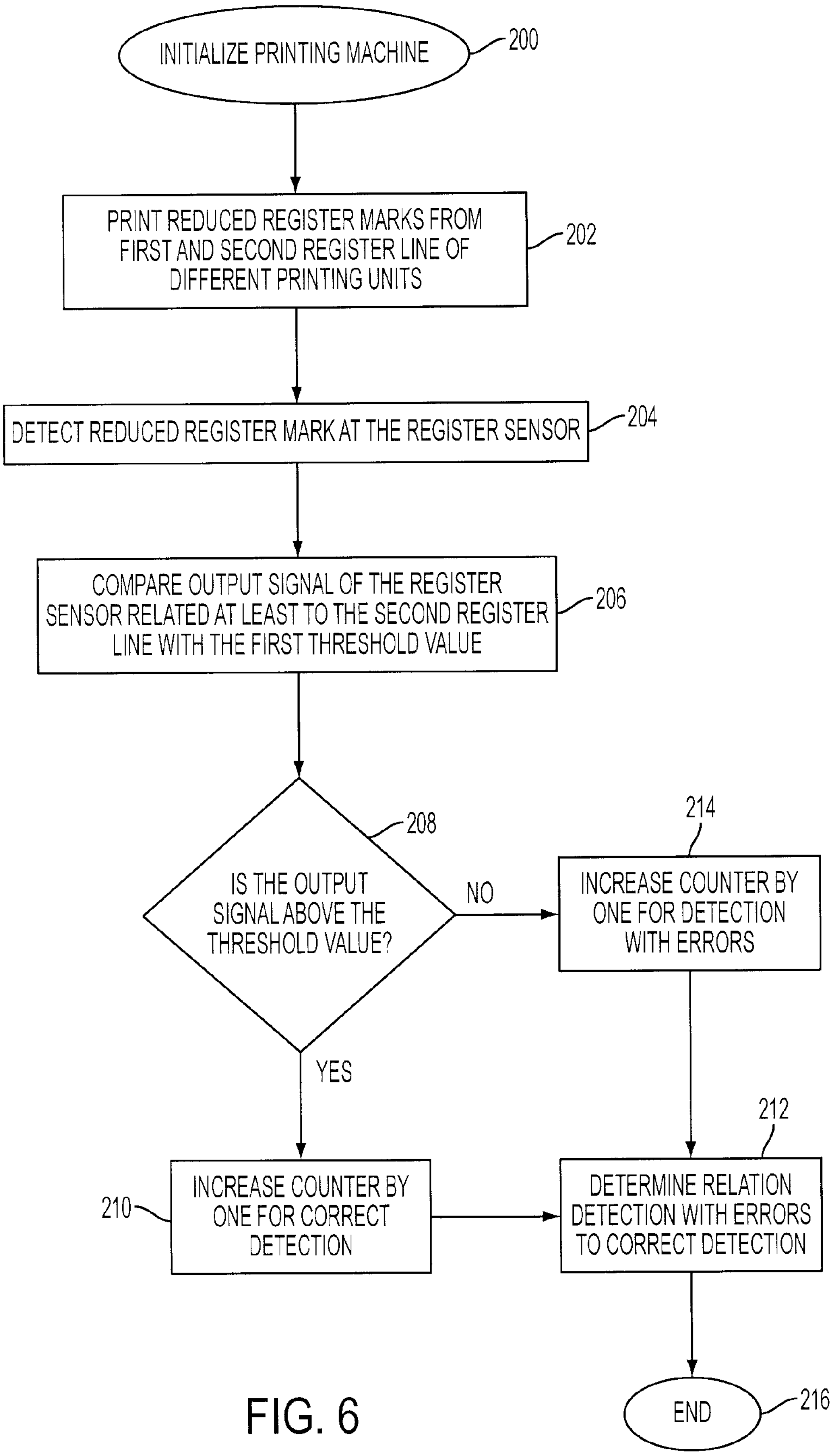

Referring to FIGS. 5 and 6, a method for checking the functionality of a multi-color printing machine such as, for example, the electrophotographic printing machine 1 in accordance with FIG. 1 will now be explained in greater detail. This functionality check may be carried out all by itself or, for example, as part of a calibration routine or in the adjustment of the circumferential register for a print job. FIG. 5 shows a first flow diagram for checking the functionality of the multi-color printing machine 1, and FIG. 6 shows a process for detecting errors in individual color separation images of the multi-color printing machine 1. The process in accordance with FIG. 6 may also be carried out as a subroutine within the process in accordance with FIG. 5, for example. Alternatively, said process may also be carried out independently of the process in accordance with FIG. 5, for example, following work on one of the printing units 5 in order to test specifically that unit's functionality.

As is obvious from FIG. 5, the printing machine 1 is first initialized in a block 100, which, for example, may comprise the start-up of the transport belt 15 and the cleaning of said belt. This includes a complete circulation of the transport belt 15 with concomitant cleaning in order to ensure that the transport belt 15 is in a completely cleaned condition for the printing of register marks. Hereinafter, it is assumed that the register marks are of the type shown by FIG. 3, although they may also be of another type (such as shown by FIG. 2, for example).

Then, in block 102, a plurality of register marks 40 is printed on the previously cleaned transport belt 15. The register marks 40 comprise respectively one register line 44 to 48 per printing unit 5, plus one additional starting register line 43 within a prespecified register frame. The starting register line 43 is typically black and is used, for example, for initializing the register sensor 8.

After the register marks 40 have been printed, they are transported via the transport belt 15 into the region of the register sensor 8 and detected there, as is also shown by block 104. The register sensor 8 generates, for example, a changing voltage signal, as indicated by FIG. 2.

In block 106, the output signal of the register sensor 8 is then compared with a threshold value in order to determine if the expected number of register lines 43 through 48 can be properly detected in each register mark. For this determination, the threshold value may be a fixed prespecified value or it may be variable. It is possible, for example, to provide a fixed threshold value for the first register line and a threshold value derived from the intensity of the first register line for the following register lines. This comparison can be, for example, carried out with the upper and lower threshold values in the manner indicated in FIG. 2—provided the output signal of the register sensor includes positive and negative amplitudes. In this method, for example, the upward or downward crossings of the threshold value, respectively, are recorded by the output signal, thereby permitting a derivation of the position of the respective register lines. If the comparison shows that a corresponding number of register lines in a register mark has been detected, the measured result relating to this register mark may be made available for additional processes. If the comparison shows that no corresponding number of register lines has been detected in a register mark, the measured result of this register mark is being discarded.

In decision block 108, it is then determined whether the register marks have been fully detected to a sufficient extent. If this is not the case, the process moves on to block 110, in which the process is ended. Of course, the data obtained during the above process may be used for the most diverse purposes such as, for example, calibration purposes, for the adjustment of a circumferential register for a print job, and for other operations. The above-described process may also be integrated in such an operation.

If it is determined in decision block 108 that the register marks were not detected to a sufficient extent, the process moves on to block 112, in which a subroutine for the detection of errors in individual color separation images is carried out.

An example of such a subroutine is explained in greater detail with reference to the flow diagram in accordance with FIG. 6. First, in block 200, the printing machine 1 is initialized, which, in turn may include a cleaning of the transport belt 15 during one complete circulation of said belt.

Subsequently, in block 202, a plurality of reduced register marks is printed on the transport belt 15. Each of the reduced register marks consists of at least one first register line (preferably black) that is printed by a first printing unit, and of a second register line that is printed by a second printing unit. The first and the second printing units are enabled in such a manner that the respective first and second register lines are printed in corresponding virtual register frames. The additional printing units are enabled in such a manner that they either do not print any register lines or that said register lines are located outside the virtual register frame. The reduced register mark may also comprise two of the first register lines, as shown by FIG. 4.

The reduced register marks that have been printed in this manner are then transported into the region of the register sensor 8 and detected on said sensor, as is shown by block 204.

Subsequently, the process moves on to block 206, in which the output signal of the register sensor 8 relating to at least the second register line is compared with a first threshold value. For this comparison, this first threshold value is preferably a threshold value that has been derived from the output signal level of the register sensor relating to the first register line, however, it may also be a fixed threshold value. For example, the first threshold value may be adjusted to a prespecified percentage of the first output signal level of the first register line.

At the same time, the output signal of the register sensor 8 relating to the first register line can also be compared with a threshold value that has been fixed and prespecified, for example, in order to determine whether the first register line has been properly printed. If this is not the case, the detection of the reduced register mark may be discarded. An excessive number of discarded reduced register marks then indicates an error in the region of the first printing unit. For this, the threshold value for the first register line is preferably higher than the expected signal level of the second register line, provided the respective colors permit this.

Subsequently, in decision block 208, it is determined for each of the register marks whether the output signal for the second register line is above the threshold value. If this is the case, the process moves on to block 210 in which, for example, a count is increased by one for each correctly detected register mark. Subsequently, the process moves on to block 212, said block being explained in greater detail hereinafter. If it has been determined in decision block 208 that the output signal relating to the second register line of one of the reduced register marks is not above the threshold value, the process moves on to block 214, in which, for example, a count for improperly detected register marks is increased.

Subsequently, the process moves on to block 212. In block 212, the ratio between the properly detected register marks and the improperly registered register marks is determined and, for example, stored in order to permit an evaluation regarding a proper detectability of the register lines of specific printing units.

Subsequently, the process moves on to block 216, in which the process is ended. The process in accordance with FIG. 6 may be repeated for each printing unit, whereby, preferably, the first register lines are generated by the same printing unit, in particular the printing unit for the color Black.

In the above-described process, it is also possible to determine, and optionally store, the position of the second register line with respect to at least one of the first register lines inside the respective register marks in order to permit a determination of position errors. At least one of the first register lines can thus be used both as a reference line for the threshold value determination and for the position determination relating to the second register line.

To the extent that the analyzer circuit being behind the comparison of the output signal of the register sensor with the first threshold value permits it is also possible to provide a comparison with several staggered threshold values in order to provide a quantitative analysis regarding the quality of the respective second register lines. For this, the respective comparative results would, of course, be separately processed. Alternatively, the above process could, of course, also be repeated with different threshold values.

In an alternative process, it is also possible to print reduced register marks that comprise at least one register line of only one printing unit inside a virtual register frame. Again, such a reduced register mark can be detected with a register sensor, and the output signal can be compared with a threshold value in order to determine a proper functionality of the one printing unit. This method is particularly suitable for the black-printing printing unit that—in the previously described process—prints the first register line as the reference line, as it were. Such a process could thus precede the above-described process. However, it is also possible to provide such a process for each individual printing unit, with the respective threshold values for each printing unit having to be carefully selected.

A specific example of a routine for the detection of errors in individual printing units of a printing machine as shown by FIG. 1 is described hereinafter, said routine being summarized in Table 1 below:

TABLE 1

Routine for the Detection of Register Mark Lines

| Rotation-Belt | Printing Units with SDI Configuration | | Printing Units with CDI Configuration | | Note |
|---|---|---|---|---|---|
| | Color(s) | Threshold | Color(s) | Threshold | |
| 1 | — | — | — | — | Belt cleaning |
| 2 | K | 25% | K | 25% | Only two black lines |
| 3 | K + Y | 25% | K + Y | 25% | Special pattern for CDI |
| 4 | K + M | 25% | K + M | 25% | Special pattern for CDI |
| 5 | K + C | 25% | K + C | 25% | Special pattern for CDI |
| 6 | K + SDI | 25% | K + CDI | 17% | Special pattern for CDI |
| 7 | K + Y | 31% | K + Y | 35% | Special pattern for CDI |
| 8 | K + M | 31% | K + M | 35% | Special pattern for CDI |
| 9 | K + C | 31% | K + C | 35% | Special pattern for CDI |
| 10 | K + SDI | 31% | K + CDI | 19% | Special pattern for CDI |
| 11 | K + Y | 37% | K + Y | 45% | Special pattern for CDI |
| 12 | K + M | 37% | K + M | 45% | Special pattern for CDI |
| 13 | K + C | 37% | K + C | 45% | Special pattern for CDI |
| 14 | K + SDI | 37% | K + CDI | 21% | Special pattern for CDI |
| 15 | K + Y + M + C + SDI | 25% | K + Y + M + C + CDI | 17% | Special pattern for CDI |

In the table, different configurations regarding the colors used in the printing units have been taken into consideration. One configuration is described as the SDI configuration that provides loading of the printing units with the colors Black (K=Carbon), Yellow (Y), Magenta (M), Cyan (C) and a spot color (SDI), the spot color providing sufficient intensity to permit good detection by the register sensor, without requiring special measures. The configuration that is described as the CDI configuration provides loading of the printing units with the colors Black (K=Carbon), Yellow (Y), Magenta (M), Cyan (C) and a colorless toner (CDI=Clear DryInk). As a rule, CDI is not suitable to permit good detection by the register sensor without special measures and is thus printed on a wide Black base line, as indicated by FIG. 2.

In the routine in accordance with Table 1, as already previously mentioned, there is one circulation of the transport belt with appropriate cleaning when no register marks are being printed.

Subsequently, first the reduced register marks with only two black lines (color K=Carbon) are printed on the transport belt by using the same printing unit. Then, the two black lines of the reduced register marks are measured in order to determine the detectability of Black. For this, first the signal relating to the first black line is compared with a fixed threshold value that is at approximately 50% of the expected signal level. Subsequently, the signal relating to the second black line is compared with a threshold value that is for example at 25% of the signal level of the first black line.

In order to check the detectability of colored register mark lines of the other printing units, during each full rotation of the transport belt, reduced register marks with two black and one colored register lines each are printed and it is attempted to successfully detect these with the register sensor. A detection can only be considered successful when the second register lines generate signals on the register sensor above a first threshold value which, for example, is at 25% of the signal level of one of the first black lines. Subsequently, it is determined what percentage of the respective marks has been success-fully detected. If one of the printing units uses CDI, i.e., Clear DryInk (a color-less toner), the corresponding line must be printed on a wide black line, as indicated by FIG. 2. Also, another first threshold value of, for example 17% of the signal level of one of the first black lines, is used for the successful detection of a CDI line.

During two additional passes, the respective threshold values for the register mark lines are increased.

As is obvious from Table 1, different staggering may be used. For example, for the standard colors (and the spot color), staggered threshold values of 25%, 31% and 37% or 25%, 35%, 45% of the signal level of one of the first register lines may be used for standard colors. With the use of Clear DryInk (CDI), it is possible, for example, to use staggered threshold values of 17%, 19% and 21% of the signal level of one of the first register lines.

Staggering permits the determination as to how much latitude of certainty exists regarding the detectability of the individual register lines.

During a final rotation, the register marks with all colors are measured.

In the case that not all the colors are to be checked (e.g., if a given printing unit was repaired at the time), a selection may be made as to what colors are to be checked.

After measuring the register marks has been completed, the recorded data are stored in a file in order to have them optionally available for further analysis. In addition, the percentage of the number of marks successfully detected in a specific color composition (so-called "coverage") is calculated. The results are stored and may be displayed to an operator of the printing machine, whereby coverages that drop below certain threshold values, can be highlighted in color, for example (for example: <80% red, <90% yellow). This file may also be used for the appropriate representation of the contrast values of the black mark ("Peak+", "Peak−") that have been provided by the register sensor.

One example where obviously a problem in the magenta printing unit was present could be represented in a table as shown by Table 2 below, for example. This would be assuming a CDI configuration of the printing units.

TABLE 2

Analysis of the detectability check in a printing machine that was equipped with CDI.

| Threshold | Yellow Coverage | Magenta Coverage | Cyan Coverage | CDI Coverage |
|---|---|---|---|---|
| 25% | 100% | 83% | 100% | |
| 31% | 100% | 0% | 100% | |
| 37% | 100% | 0% | 100% | |
| 17% | | | | 100% |
| 19% | | | | 100% |
| 21% | | | | 100% |

With the use of such a representation, the service technician will be specifically pointed to the problem printing unit, in particular when the results for Magenta are highlighted in color, for example. Obviously, in the above example, a problem existed in the Magenta printing unit. This lead to a reduced number of detectable register marks that contained magenta-colored lines. With a normal threshold value of 25%, it was still possible to recognize 83% of the marks, so that there is still some uncertainty regarding the quality of the lines; however, with a slightly increased threshold value, there is no longer any uncertainty. Under normal circumstances, the lines of Yellow, Magenta, Cyan and the custom colors should be detectable up to a threshold value of 55%, for example.

Of course, a simplified output may also be provided, this output pointing out only the printing unit(s) with error(s).

Although the invention was described considering specific embodiments, the invention is not restricted thereto. Rather developments and modifications within the protective scope of the following claims will be obvious to those skilled in the art.

The invention claimed is:

1. Method for detecting errors in individual color separation images of a multi-color printing machine, in particular an electrophotographic printing machine, comprising a plurality of printing units, said method comprising the following steps:

using the electrophotographic printing machine to print a plurality of first register lines with a first printing unit and pluralities of second or additional register lines with respectively each one of a second and additional printing units of the plurality of printing units in such a manner that each of the first register lines, together with a respective one of the second or additional register lines, is printed within a respective register frame that prespecifies a correct positioning of the register lines;

detecting the plurality of said first and said second or additional register lines in the respective register frames with a register sensor; and using an analyzer circuit to compare a signal of the register sensor relating to the respective second or additional register lines with a first fixed intensity threshold value in order to determine if the second or additional register lines are recognizable.

2. Method as in claim 1, further including deriving intensity threshold values for each of the second or additional register lines from the intensity (of one) of the first register line(s).

3. Method as in claim 1, wherein two of the first register lines per register frame are printed with the first printing unit.

4. Method as in claim 1, wherein the signal of the register sensor relating to the respective second or additional register line is compared with at least one additional intensity threshold value that is higher than the first fixed intensity threshold value in order to determine if the second or additional register lines can also be recognized with the higher intensity threshold value.

5. Method as in claim 1, wherein printing of the first and the second or of the first and the additional register lines and detecting them are repeated, and wherein the signal of the register sensor relating to the respective second or additional register line is compared with at least one intensity threshold value that is higher than the first fixed intensity threshold value in order to determine if the second register lines can also be recognized with the higher intensity threshold value.

6. Method as in claim 1, wherein the first fixed intensity threshold value is smaller than 50% of the expected signal.

7. Method as in claim 4, wherein the additional intensity threshold value is between 50% and 70% of the expected signal.

8. Method as in claim 1, wherein the signal of the register sensor is used to additionally determine a position of the second or the additional register lines relative to the first register line.

9. Method as in claim 8, wherein the respective positions of the second or the additional register lines are compared in order to determine an overlap thereof.

10. Method as in claim 1, wherein the first printing unit is used for printing black register lines.

11. Method as in claim 1, wherein the first fixed intensity threshold value used for comparison is selected differently for different colors.

12. Method as in claim 1, wherein the register lines are each printed on a circulating transport belt of the printing machine, said transport belt being cleaned downstream of the register sensor.

* * * * *